(12) United States Patent
Kim et al.

(10) Patent No.: US 12,505,674 B2
(45) Date of Patent: Dec. 23, 2025

(54) SYSTEM AND METHOD FOR ESTIMATING PEDESTRIAN RISK SITUATION

(71) Applicant: Electronics and Telecommunications Research Institute, Daejeon (KR)

(72) Inventors: Dae Hoe Kim, Daejeon (KR); Jinyoung Moon, Daejeon (KR); Sungchan Oh, Daejeon (KR); Je-Seok Ham, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 18/584,703

(22) Filed: Feb. 22, 2024

(65) Prior Publication Data
US 2025/0166381 A1 May 22, 2025

(30) Foreign Application Priority Data
Nov. 16, 2023 (KR) .......................... 10-2023-0159091

(51) Int. Cl.
| | |
|---|---|
| *G06V 20/52* | (2022.01) |
| *G06V 10/25* | (2022.01) |
| *G06V 10/26* | (2022.01) |
| *G06V 10/75* | (2022.01) |
| *G06V 10/82* | (2022.01) |
| *G06V 40/10* | (2022.01) |
| *G08G 1/16* | (2006.01) |

(52) U.S. Cl.
CPC .............. *G06V 20/52* (2022.01); *G06V 10/25* (2022.01); *G06V 10/26* (2022.01); *G06V 10/751* (2022.01); *G06V 10/82* (2022.01); *G06V 40/10* (2022.01); *G08G 1/166* (2013.01)

(58) Field of Classification Search
CPC ...... G06V 10/82; G06V 10/764; G08G 1/166; G06T 7/10; G06T 7/73
See application file for complete search history.

(56) References Cited

U.S. PATENT DOCUMENTS

| | | | |
|---|---|---|---|
| 9,934,440 B1 * | 4/2018 | Kim ...................... G06F 18/214 |
| 10,108,867 B1 * | 10/2018 | Vallespi-Gonzalez ...................... G06V 20/58 |
| 10,867,216 B2 * | 12/2020 | Skaff ...................... G06V 20/00 |
| 11,282,389 B2 | 3/2022 | Khadloya et al. |
| 11,417,106 B1 * | 8/2022 | Alzahrani ................. G06T 7/20 |
| 11,557,089 B1 * | 1/2023 | Choi ........................ G08G 1/04 |
| 11,715,280 B2 * | 8/2023 | Kim ........................ G06T 5/50 382/103 |
| 2018/0096595 A1 * | 4/2018 | Janzen ................... G06V 10/94 |

(Continued)

FOREIGN PATENT DOCUMENTS

| KR | 10-1739988 B1 | 5/2017 |
|---|---|---|
| KR | 10-2317320 B1 | 10/2021 |

(Continued)

*Primary Examiner* — Justin W Rider
(74) *Attorney, Agent, or Firm* — Sughrue Mion, PLLC (57) ABSTRACT

A method of estimating a pedestrian risk situation includes receiving an image captured by a CCTV camera that is installed at a predetermined location, generating a bounding box of a pedestrian within the image, generating a segmentation map by performing semantic segmentation on the image, generating a ground area map by identifying a ground area in the segmentation map, and estimating semantic location information of the pedestrian based on the bounding box and the ground area map.

15 Claims, 9 Drawing Sheets

(56) References Cited

U.S. PATENT DOCUMENTS

| | | | |
|---|---|---|---|
| 2019/0147250 A1* | 5/2019 | Zhang | G06V 20/41 |
| | | | 382/224 |
| 2021/0081676 A1* | 3/2021 | Kim | G06V 20/47 |
| 2021/0225013 A1* | 7/2021 | Kim | G06V 40/10 |
| 2021/0279455 A1 | 9/2021 | Byon et al. | |
| 2021/0334542 A1* | 10/2021 | Shankar | G06V 10/764 |
| 2021/0406301 A1* | 12/2021 | Kim | G06F 16/535 |
| 2022/0058399 A1* | 2/2022 | Neser | G08G 1/0116 |
| 2022/0148193 A1 | 5/2022 | Choi et al. | |
| 2022/0301275 A1* | 9/2022 | Khadloya | G06V 10/62 |
| 2023/0030987 A1* | 2/2023 | Townsend | G06V 20/52 |
| 2024/0125899 A1* | 4/2024 | Khadem | G01S 7/4802 |
| 2024/0144151 A1* | 5/2024 | Maikhuri | G06Q 10/06398 |
| 2025/0061721 A1* | 2/2025 | Betigeri | G06V 40/172 |

FOREIGN PATENT DOCUMENTS

| | | | | |
|---|---|---|---|---|
| KR | 20220132367 A * | 9/2022 | | G08G 1/012 |
| KR | 10-2519367 B1 | 4/2023 | | |

\* cited by examiner

——— : SAFE STATE(1210)
--------- : RISKY STATE(1220)

SYSTEM AND METHOD FOR ESTIMATING PEDESTRIAN RISK SITUATION

CROSS-REFERENCE TO RELATED APPLICATION

This application claims priority to and the benefit of Korean Patent Application No. 10-2023-0159091, filed on Nov. 16, 2023, the disclosure of which is incorporated herein by reference in its entirety.

BACKGROUND

1. Technical Field

The present disclosure relates to a system and method for estimating a pedestrian risk situation.

2. Related Art

A technology for recognizing on which kind of a road surface (e.g., a road, a crosswalk, or a sidewalk) a pedestrian is in a CCTV image and recognizing whether the pedestrian is placed at a location that is potentially risky, such as a road or a crosswalk, is a technology that is necessary for the safety of a pedestrian, such as giving warning to a driver when the pedestrian is on the road or the crosswalk. However, conventionally, research of such a technology has been rarely performed.

Conventional technologies have been basically developed based on detection and tracking technologies for extracting coordinates of a pedestrian within an image. An example of a technology for detecting a pedestrian within a crosswalk includes a method of installing CCTV so that an interested area, such as a crosswalk, occupies a large area in an image as much as possible. However, such a method is physically restricted by a location where CCTV is installed and is restricted by requirements (e.g., a minimum size of a person and a photographing angle) for a pedestrian detection algorithm. Furthermore, there is a limit in that it is difficult to determine at which location (e.g., a road, a crosswalk, or a sidewalk) a pedestrian within an image is actually present.

As another method, there is a method of previously setting an interested area, such as a crosswalk within an image, and detecting whether a person that is detected or tracked is present in the interested area. However, such technologies have a problem in that a user has to set an interested area for each CCTV one by one.

SUMMARY

Various embodiments are directed to providing a system and method for estimating a pedestrian risk situation, which recognize a pedestrian from an image, generate a ground area map by performing semantic segmentation, and then estimate a semantic location and degree of risk of the pedestrian based on the ground area map.

However, objects of the present disclosure to be achieved are not limited to the aforementioned object, and other objects may be present.

A method of estimating a pedestrian risk situation according to a first aspect of the present disclosure includes receiving an image captured by a CCTV camera that is installed at a predetermined location, generating a bounding box of a pedestrian within the image, generating a segmentation map by performing semantic segmentation on the image, generating a ground area map by identifying a ground area in the segmentation map, and estimating semantic location information of the pedestrian based on the bounding box and the ground area map.

Furthermore, a method of estimating a pedestrian risk situation according to a second aspect of the present disclosure includes receiving an image captured by a CCTV camera that is installed at a predetermined location, generating a bounding box of a pedestrian within the image, generating a segmentation map by performing semantic segmentation on the image, generating a ground area map by identifying a ground area in the segmentation map, extracting an image area of a surrounding part of the pedestrian from the image and the bounding box, and estimating a degree of risk of the pedestrian based on the image area of the surrounding part and the ground area map.

Furthermore, a system for estimating a pedestrian risk situation according to a third aspect of the present disclosure includes a communication module configured to receive an image captured by a CCTV camera installed at a predetermined location, memory in which a program for estimating a degree of risk of a pedestrian based on the captured image has been stored, and a processor configured to generate a bounding box of the pedestrian within the image, generate a segmentation map by performing semantic segmentation on the image, generate a ground area map by identifying a ground area in the segmentation map, extract an image area of a surrounding part of the pedestrian from the image and the bounding box, and estimate a degree of risk of the pedestrian based on the image area of the surrounding part and the ground area map, by executing the program stored in the memory.

Furthermore, a system for estimating a pedestrian risk situation according to a fourth aspect of the present disclosure includes a communication module configured to receive an image captured by a CCTV camera installed at a predetermined location, memory in which a program for estimating semantic location information of a pedestrian has been stored based on the captured image, and a processor configured to generate a bounding box of a pedestrian within the image, generate a segmentation map by performing semantic segmentation on the image, generate a ground area map by identifying a ground area in the segmentation map, and estimate semantic location information of the pedestrian based on the bounding box and the ground area map, by executing the program stored in the memory.

A computer program according to another aspect of the present disclosure executes the method of estimating a pedestrian risk situation in combination with a computer, that is, hardware, and is stored in a computer-readable recording medium.

Other details of the present disclosure are included in the detailed description and the drawings.

In the existing technology, a location where CCTV is installed is restricted, that is, CCTV needs to be installed so that a crosswalk occupies a large area within an image as much as possible. Accordingly, the installation location is restricted, and an additional cost may occur. However, in an embodiment of the present disclosure, a location where CCTV is installed can be relatively freely selected by overcoming such restriction.

Furthermore, in the existing method, a user has to manually designate an interested area for CCTV. This is cumbersome and time-consuming. However, the method and system according to embodiments of the present disclosure have an advantage in that a user can easily use the method and system without the need to manually set a specific area because an interested area can be automatically detected.

Furthermore, a direction in which CCTV photographs an image may be finely changed depending on the time and a situation. In the existing method, CCTV needs to be manually adjusted every time. However, an embodiment of the present disclosure has an advantage in that a movement of a pedestrian can be continuously monitored in response to such a change.

Effects of the present disclosure are not limited to the aforementioned effects, and other effects not described above may be evidently understood by a person having ordinary knowledge in the art from the following description.

DETAILED DESCRIPTION

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Figure 1:
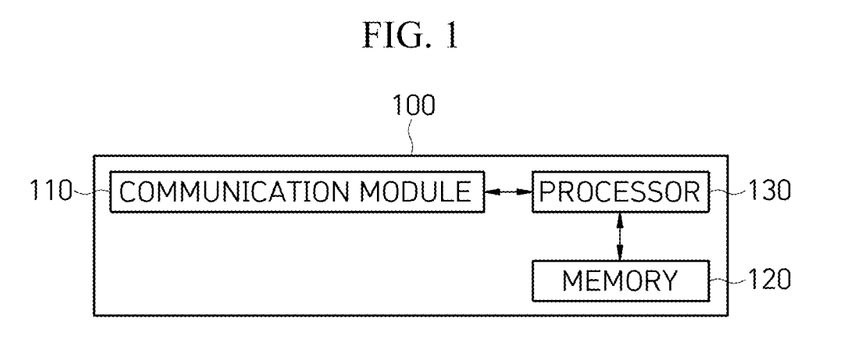
FIG. 1 is a block diagram of a system for estimating a pedestrian risk situation according to an embodiment of the present disclosure.

FIG. 1 is a block diagram of a system 100 for estimating a pedestrian risk situation according to an embodiment of the present disclosure.

The system 100 for estimating a pedestrian risk situation according to an embodiment of the present disclosure includes a communication module 110, memory 120, and a processor 130.

The communication module 110 receives image information obtained through a CCTV camera that is installed at a predetermined location. The communication module 110 may include both a wired communication module and a wireless communication module. The wired communication module may be implemented as a power line communication device, a telephone line communication device, cable home (MoCA), Ethernet, IEEE1294, an integrated wired home network, or an RS-485 controller. Furthermore, the wireless communication module may be constructed as a module for implementing a function, such as a wireless LAN (WLAN), Bluetooth, an HDR WPAN, UWB, ZigBee, impulse radio, a 60 GHz WPAN, binary-CDMA, a wireless USB technology, a wireless HDMI technology, 5th generation (5G) communication, long term evolution-advanced (LTE-A), long term evolution (LTE), or wireless fidelity (Wi-Fi).

The memory 120 stores a program for estimating semantic location information of a pedestrian and estimating a degree of risk of the pedestrian based on a captured image. The memory 120 commonly refers to a nonvolatile storage device that retains information stored therein although power is not supplied to the nonvolatile storage device and a volatile storage device. For example, the memory 120 may include NAND flash memory such as a compact flash (CF) card, a secure digital (SD) card, a memory stick, a solid-state drive (SSD), and a micro SD card, a magnetic computer memory device such as a hard disk drive (HDD), and an optical disc drive such as CD-ROM and DVD-ROM.

The processor 130 may control at least another component (e.g., hardware or software component) of the system 100 for estimating a pedestrian risk situation by executing software, such as a program, and may perform various data processing or operations.

In an embodiment of the present disclosure, the processor 130 may use at least one of machine learning, a neural network, or a deep learning algorithm, as artificial intelligence (AI) algorithm for estimating semantic location information of a pedestrian and estimating a degree of risk of the pedestrian. Examples of the neural network may include a model, such as a convolutional neural network (CNN), a deep neural network (DNN), or a recurrent neural network (RNN).

In an embodiment of the present disclosure, AI may mean a technology for imitating the learning ability, inference ability, and perception ability of a human and implementing the abilities by using a computer. AI may basically include machine learning to an element technology using machine learning. Machine learning may mean an algorithm for extracting at least one feature of learning data in order to classify input data. Furthermore, technologies for imitating functions of a human brain, such as the judgment and recognition of the human brain, by using the machine learning algorithm may also be understood as the category of AI. AI may include technical fields, such as linguistic understanding, visual understanding, inference/prediction, knowledge representation, and operation control.

In an embodiment of the present disclosure, the artificial neural network may be designed to implement a brain structure of a human on a computer, and may include a plurality of network nodes that schemes a neuron of a neural network of a human and that has a weight. The plurality of network nodes may scheme the synaptic activities of a neuron that exchanges signals through a synapse, and may have a connection relation therebetween. In the artificial neural network, a plurality of network nodes may be disposed in layers having different depths, and may exchange data based on a convolution connection relation therebetween. The artificial neural network may be a convolution neural network, for example.

In the present disclosure, the artificial neural network is a model that has been trained according to a predetermined machine learning method, and may mean a model in which a weight for at least one network node included in a model that has not been trained has been determined by machine learning. Machine learning may mean that computer software improves the data processing ability through learning using data and data processing experiences. The artificial neural network has been constructed by modeling a correlation between data. The correlation may be represented by a plurality of parameters. The artificial neural network derives the correlation between data by extracting and analyzing features from given data. Optimizing parameters of the artificial neural network by repeating such a process may be said to be machine learning. For example, the artificial neural network may learn mapping (i.e., a correlation) between an input and an output with respect to data that are given as input and output pairs. Alternatively, the artificial neural network may learn a relation between given data by deriving regularity between the given data although only input data are given. In the present disclosure, the "artificial neural network" may be interchangeably used with an "artificial neural network model" or an "AI algorithm".

Hereinafter, a method that is performed by the system 100 for estimating a pedestrian risk situation according to an embodiment of the present disclosure is described with reference to FIGS. 2 to 10.

Figure 2:
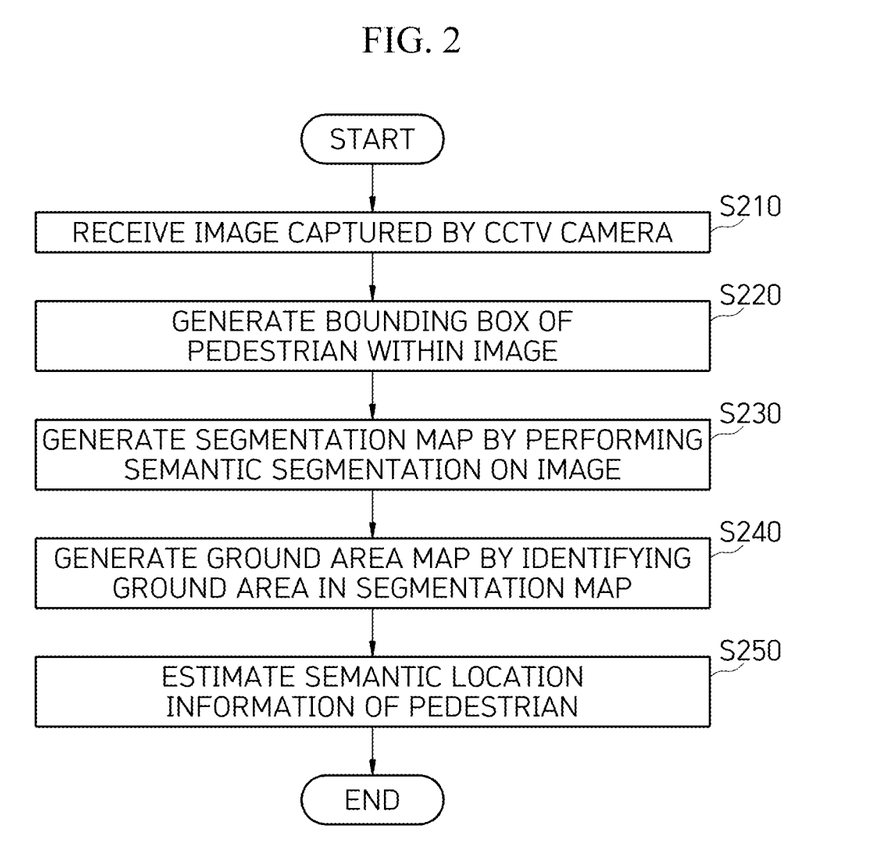
FIG. 2 is a flowchart of a method of estimating a pedestrian risk situation according to a first embodiment of the present disclosure.

FIG. 2 is a flowchart of a method of estimating a pedestrian risk situation according to a first embodiment of the present disclosure. The method of estimating a pedestrian risk situation according to an embodiment of the present disclosure includes step S210 of receiving an image captured by a CCTV camera that is installed at a predetermined location, step S220 of generating a bounding box of a pedestrian within an image, step S230 of generating a segmentation map by performing semantic segmentation on the image, step S240 of generating a ground area map by identifying the ground area in the segmentation map, and step S250 of estimating semantic location information of the pedestrian based on the bounding box and the ground area map.

First, an RGB frame is obtained through a CCTV camera that is installed at a predetermined location where a pedestrian passes, such as a crosswalk or a children protection zone (S210). An image frame that is streamed in real time or a video file that has been previously stored may be used as the RGB frame.

Next, the bounding box of a pedestrian within an image is generated (S220). In this case, an arbitrary scheme may be applied to a method of generating the bounding box of persons who are present in the RGB frame within the image.

Next, the segmentation map is generated by performing semantic segmentation on the image (S230). This is for classifying to which object each pixel belongs in the RGB frame. In this case, the segmentation map may be represented as a probability map for each of c classes. In step S230, semantic segmentation including an area related to a road surface, such as a road, a crosswalk, or a sidewalk, is performed on a target object.

Next, a ground area map is generated by identifying a ground area in the segmentation map (S240). In step S240, an area related to the ground is automatically identified by using a given segmentation map.

Figure 3:
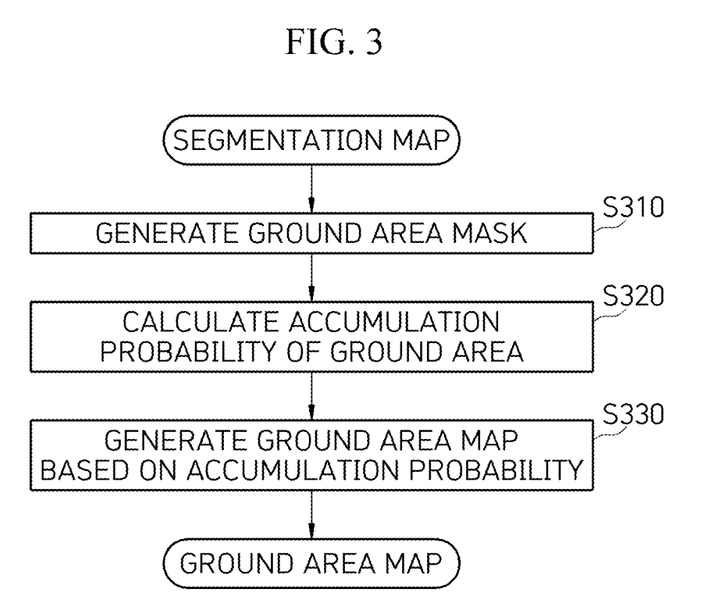
FIG. 3 is a diagram for describing a process of generating a ground area map in an embodiment of the present disclosure.
Figure 4:
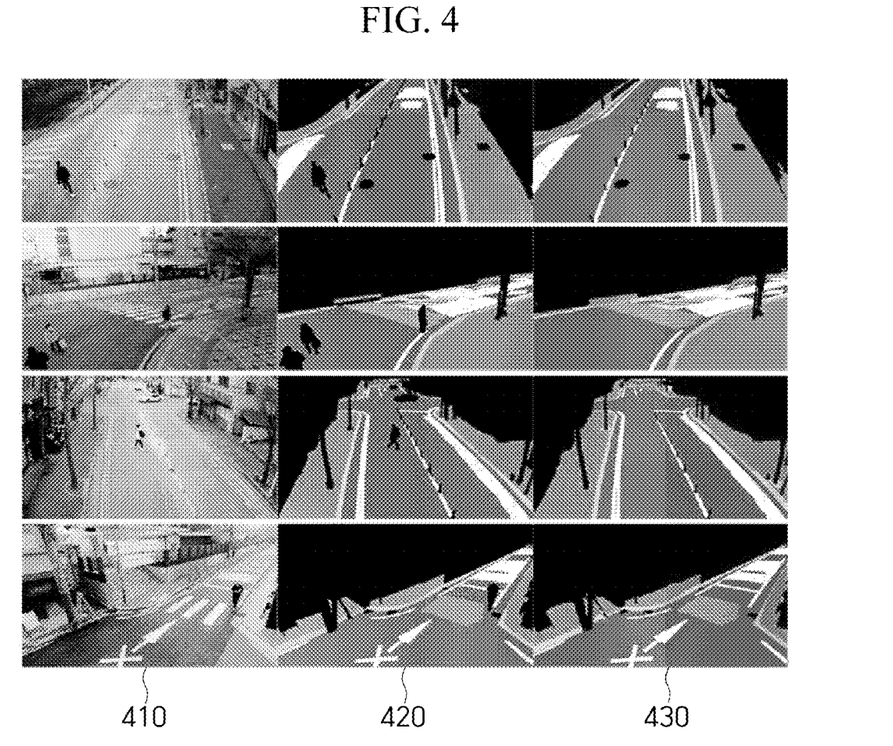
FIG. 4 is a diagram illustrating an example of an estimated ground area map in an embodiment of the present disclosure.

FIG. 3 is a diagram for describing a process of generating a ground area map in an embodiment of the present disclosure. FIG. 4 is a diagram illustrating an example of an estimated ground area map in an embodiment of the present disclosure.

In general, it is difficult to accurately recognize a ground area for determining a semantic location of a pedestrian because various objects, such as a person and a vehicle, occlude a ground area in a single frame. Accordingly, one embodiment of the present disclosure addresses this problem by taking advantage of the fact that the ground area of a fixedly installed CCTV camera changes very little over time. By accumulating the results of image segmentation, it is possible to exclude the information of the object area and extract the ground area.

As an embodiment, the ground area map is generated by accumulating the probability of an interested class (i.e., a ground area) in a segmentation map. For this purpose, a ground area mask in which pixels belonging to the ground area are set as true is generated (S310). In this case, the ground area mask may be defined like Equation 1.

$$M_i(x) = \begin{cases} 1, & \mathrm{argmax}_c P_{c,i}(x) \in c_{ground}, \\ 0, & \text{otherwise} \end{cases} \quad \text{[Equation 1]}$$

In Equation 1, x is pixel coordinates. $P_{c,i}$ a segmentation map indicative of the probability of a class c in an i-th frame. $C_{ground}$ is a class set of an interested ground area (e.g., a roadway, a crosswalk, or a sidewalk).

Next, an accumulation probability of the ground area over time is calculated through Equation 2 by applying the ground area mask to the segmentation map (S320).

$$A_{c,i}(x) = A_{c,i-1}(x) + P_{c,i-1}(x) \circ M_{i-1}(x) \quad \text{[Equation 2]}$$

In Equation 2, ∘ means a product operation between matrix elements.

Next, a ground area map indicating to which ground area each pixel belongs is generated based on the accumulation probability (S330).

In this case, a process of normalizing the accumulation probability may be additionally performed. For the normalization, the number of pixels for the probability that has been accumulated up to the i-th frame for each pixel is calculated through Equation 3.

$$N_i(x) = N_{i-1}(x) + M_{i-1}(x) \qquad \text{[Equation 3]}$$

Furthermore, the ground area map indicating to which ground area each pixel belongs may be calculated through Equation 4.

$$G_i(x) = \underset{c}{\mathrm{argmax}} \frac{A_{c,i}(x)}{N_i(x)} \qquad \text{[Equation 4]}$$

An example of a ground area map estimated through such a process is the same as that illustrated in FIG. 4. It may be seen that a ground area that is hidden by a moving object in image segmentation results can be well estimated. In FIG. 4, the left side shows an input image 410, the middle shows image segmentation results 420, and the right side shows ground area estimation results 430.

Referring back to FIG. 2, semantic location information of the pedestrian is estimated based on the bounding box and the ground area map (S250).

Figure 5:
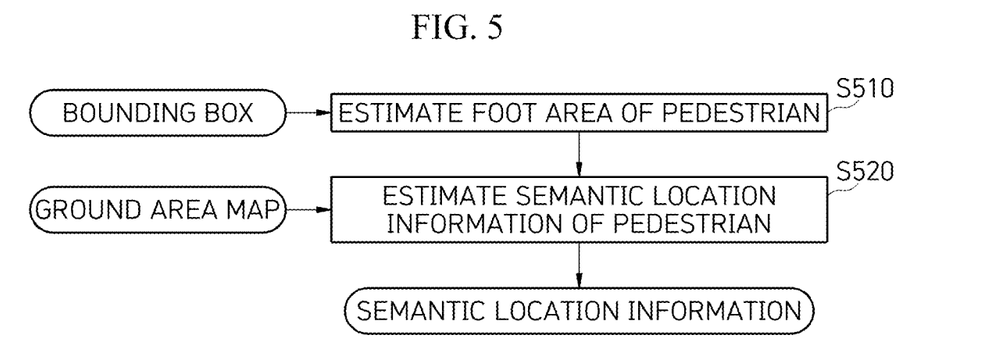
FIG. 5 is a diagram for describing a process of estimating semantic location information of a pedestrian in an embodiment of the present disclosure.
Figure 6:
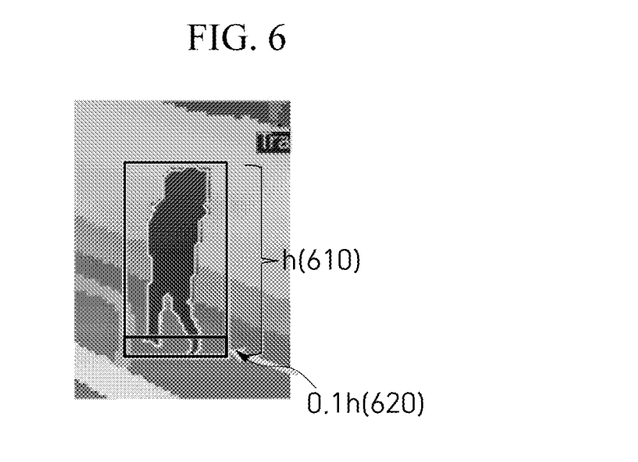
FIG. 6 is a diagram for describing a process of estimating a foot area of a pedestrian.
Figure 7:
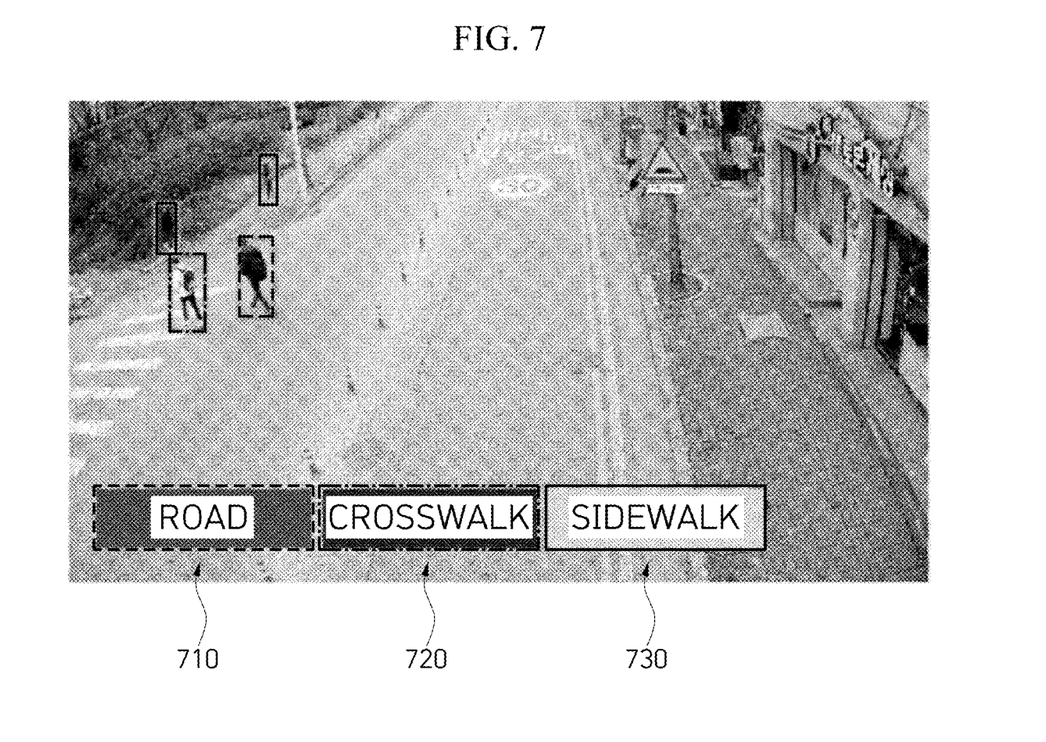
FIG. 7 is a diagram illustrating an example of the results of the estimation of semantic location information of a pedestrian in an embodiment of the present disclosure.

FIG. 5 is a diagram for describing a process of estimating semantic location information of a pedestrian in an embodiment of the present disclosure. FIG. 6 is a diagram for describing a process of estimating a foot area of a pedestrian. FIG. 7 is a diagram illustrating an example of the results of the estimation of semantic location information of a pedestrian in an embodiment of the present disclosure.

First, in order to determine which ground area a pedestrian is actually standing in, a foot area of the pedestrian is estimated from a bounding box (S510). In an embodiment of the present disclosure, as illustrated in FIG. 6, a bottom area 620 having a predetermined ratio from size information of a bounding box 610 may be estimated as a foot area of a pedestrian. In this case, the predetermined ratio may be set to 10%.

Next, a ground area corresponding to a class that has the largest number of pixels corresponding to the foot area of the pedestrian in a ground area map may be estimated as semantic location information of the pedestrian (S520).

Referring to FIG. 7, semantic location information of a pedestrian may be divided into a road 710, a crosswalk 720, and a sidewalk 730, for example, and may be differently displayed through different colors or text.

Figure 8:
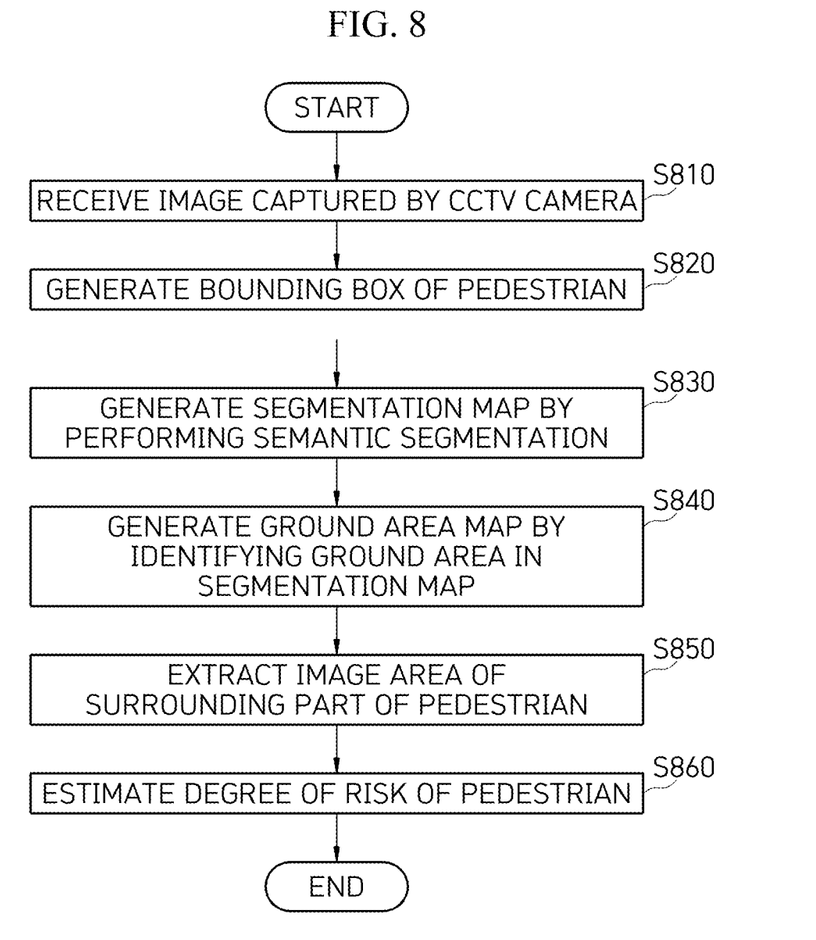
FIG. 8 is a flowchart of a method of estimating a pedestrian risk situation according to a second embodiment of the present disclosure.

FIG. 8 is a flowchart of a method of estimating a pedestrian risk situation according to a second embodiment of the present disclosure. In this case, the second embodiment of the present disclosure includes some common technical characteristics with the first embodiment, and redundant contents of the some common technical characteristics are omitted, if possible.

The first embodiment of the present disclosure relates to the estimation of semantic location information of a pedestrian. The second embodiment relates to the estimation of a degree of risk of a pedestrian. The estimation of the semantic location information and the estimation of the degree of risk are not differently performed, but may be additionally applied to the first and second embodiments. This means that a step of estimating a degree of risk of a pedestrian may be additionally performed after semantic location information of the pedestrian is estimated in the first embodiment.

First, when an image captured by a CCTV camera that is installed at a predetermined location is received (S810), the bounding box of a pedestrian within the image is generated (S820).

Next, a segmentation map is generated by performing semantic segmentation on the image (S830). A ground area map is generated by identifying a ground area in the segmentation map (S840).

Next, an image area of a surrounding part of the pedestrian is extracted based on the bounding box (S850). Furthermore, a degree of risk of the pedestrian is estimated based on the image area of the surrounding part and the ground area map (S860).

Figure 9:
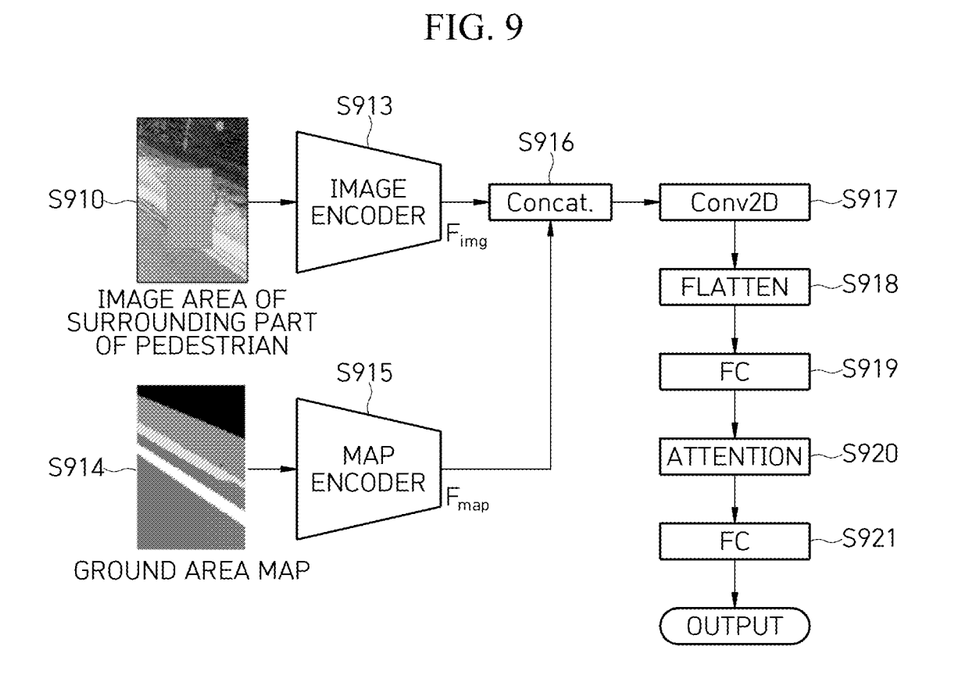
FIG. 9 is a diagram for describing a process of estimating a degree of risk of a pedestrian in an embodiment of the present disclosure.
Figure 10:
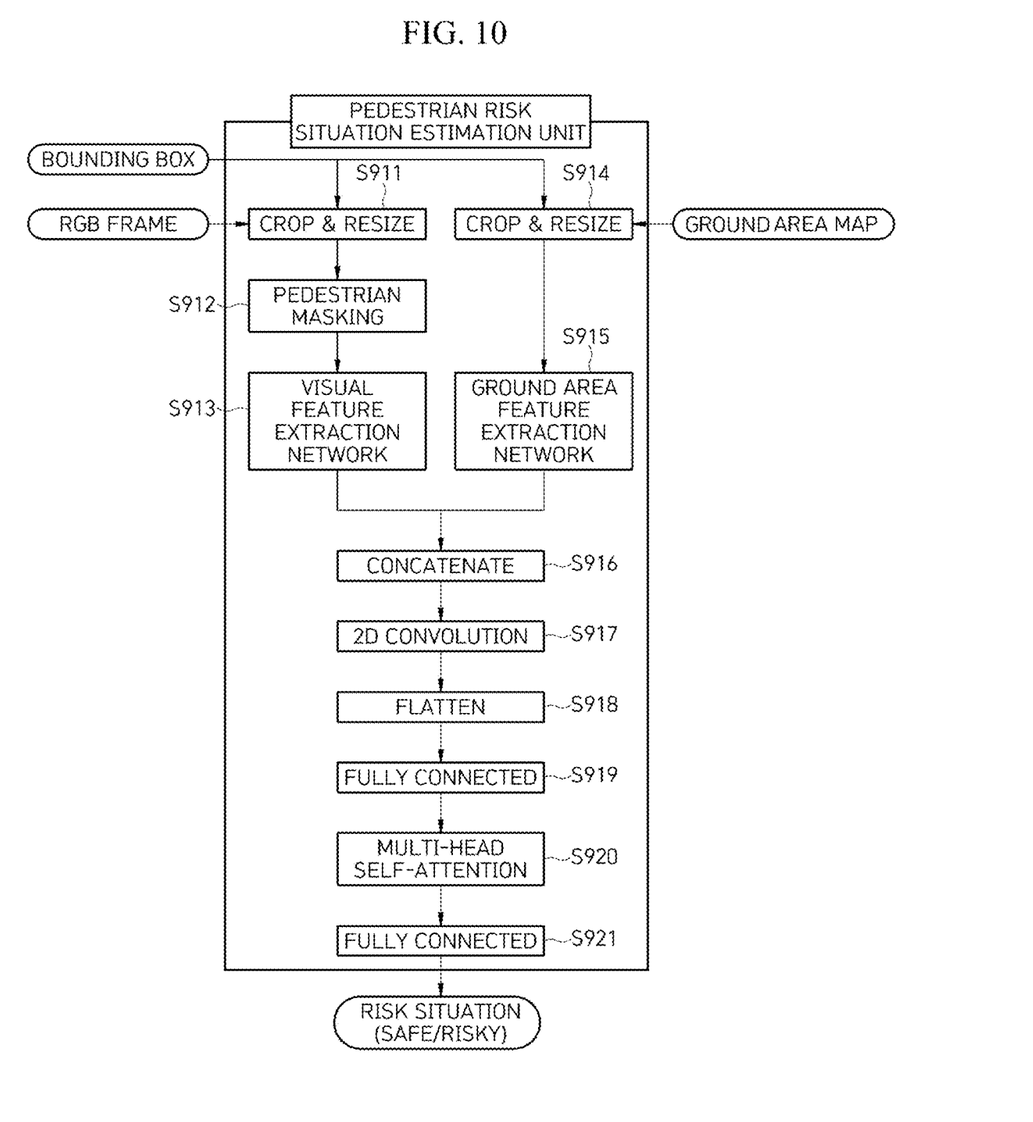
FIG. 10 is a diagram for describing an estimation network that estimates a degree of risk of a pedestrian in an embodiment of the present disclosure.

FIG. 9 is a diagram for describing a process of estimating a degree of risk of a pedestrian in an embodiment of the present disclosure. FIG. 10 is a diagram for describing an estimation network that estimates a degree of risk of a pedestrian in an embodiment of the present disclosure.

In an embodiment of the present disclosure, an image area of a surrounding part of a pedestrian is extracted from an RGB image (S910). Whether the pedestrian is located at a location (e.g., a road or a crosswalk) having a potential risk or in a safe location (e.g., a sidewalk) is estimated by using a ground area map that has been obtained in a previous step (S914). In an embodiment of the present disclosure, an estimation network that has been invented to effectively fuse the RGB image and the ground area map and that has been illustrated in FIG. 9 is applied in this process.

In an embodiment of the present disclosure, first, a first feature map including visual features of the surrounding part of the pedestrian may be extracted by inputting an image and a bounding box to an image encoder (S913)

Specifically, in order to extract an image area of a surrounding part of each pedestrian from the RGB image, a first crop image is generated by cropping an area corresponding to a predetermined multiple size of a bounding box (e.g., two times) of the pedestrian (S911).

Next, an area corresponding to the bounding box is masked from the first crop image (S912). In FIG. 9, the bounding box area of the pedestrian in the first crop image was filled in a gray color in order to exclude that visual information of the pedestrian.

Next, the first feature map, including the visual features of the surrounding part of the pedestrian, is extracted by inputting an image from which the area corresponding to the bounding box has been removed to a visual feature extraction network that has been pre-trained (S913). For example, the first feature map $F_{img}$ is extracted from the output of the last convolutional layer of VGG19, which has been pre-trained in ImageNet by inputting the image from which the area corresponding to the bounding box has been removed. The first feature map includes the visual features of the surrounding part of the pedestrian.

Furthermore, in an embodiment of the present disclosure, a second feature map including ground features of the surrounding part of the pedestrian may be extracted by inputting the bounding box and the ground area map to a map encoder (S915).

Specifically, after the ground area map is converted into an RGB image, the second crop image is generated by cropping the same area as the area of the first crop image (S914). The ground area map includes ground information for checking what kind of ground the pedestrian stands on. In order to extract the ground information, the ground area map is converted into the RGB image. Furthermore, the same area as the area that has been cropped in the first crop image is cropped from the converted RGB image, and the size of the area is adjusted to a 224×224 size.

Next, the second feature map including the ground features of the surrounding part of the pedestrian is extracted by inputting the second crop image to a pre-trained road area feature extraction network (S915). In an embodiment of the present disclosure, an atrous convolution is used in this process, for example, in order to extract a wider spatial feature without down-sampling. Three 3×3 atrous convolutions in which the numbers of filters are 32, 64, and 128 and dilation rates are 2, 4, and 8, respectively, have been applied to the ground area map. Furthermore, the second feature map $F_{map}$ is extracted by applying 32×32 max pooling to the output of the last layer. The second feature map includes the ground feature information of the surrounding part of the pedestrian.

Next, in order to fuse the features of the first and second feature maps while maintaining two-dimensional space information of the first and second feature maps, the first and second feature maps are concatenated in a channel direction (S916). A convolutional layer in which a kernel size is 3×3 and the number of filters is 512 is applied to the first and second feature maps (S917).

Next, in order to make the fused feature into a one-dimensional feature vector, a fully connected layer including a flatten layer and 512 units is applied to the fused feature (S918 and S919).

Next, multi-head self-attention including 8 heads each being 32 dimensions is applied in order to focus a portion that is helpful to classification in the generated feature vector (S920).

Finally, a degree of risk (i.e., a risk situation probability) of the pedestrian is constructed to become the final output by applying the fully connected layer having one unit (S921).

In the aforementioned description, each of steps S210 to S921 may be further divided into additional steps or the steps may be combined into smaller steps depending on an implementation example of the present disclosure. Furthermore, some of the steps may be omitted, if necessary, and the sequence of the steps may be changed. Furthermore, the contents described with reference to FIG. 1 and the contents described with reference to FIGS. 2 to 10 may be mutually applied.

Hereinafter, effects of the system 100 and method for estimating a pedestrian risk situation according to embodiments of the present disclosure are described in detail through the results of the test of the system 100 and the method with reference to FIGS. 11 and 12.

In an embodiment of the present disclosure, in order to evaluate quantitative performance, 200 video clips (each 30 seconds) were used in a "children road walking risk behavior image within a children protection zone" that was provided by an AI Hub. 71,898 risk situation ROIs and 68,181 safety situation ROIs were generated from the corresponding video. The video clips were evaluated by dividing the video clips into a training set including 100 video clips and a testing set including 100 video clips. Accuracy (ACC), Precision, Recall, F1 score, and Area under the ROC curve (AUC) were used for evaluation.

In this case, Accuracy (ACC), Precision, and Recall are defined like Equations 5 to 7, respectively.

$$ACC = \frac{TP + TN}{TP + TN + FP + FN} \qquad \text{[Equation 5]}$$

$$Precision = \frac{TP}{TP + FP} \qquad \text{[Equation 6]}$$

$$Recall = \frac{TP}{TP + FN} \qquad \text{[Equation 7]}$$

In Equations 5 to 7, TP means the number of true positive samples. TN means the number of true negative samples. FP means the number of false positive samples. FN means the number of false negative samples.

F1 score is a harmonic mean of Precision and Recall, and provides a balanced evaluation for performance of the model.

$$F1 = \frac{2 \times \text{precision} \times \text{recall}}{\text{precision} + \text{recall}} \qquad \text{[Equation 8]}$$

AUC is an area under the ROC curve and is defined like Equation 9.

$$AUC_{(p)} = \frac{\sum_{S_0 \in S^0} \sum_{S_1 \in S^1} 1[p(s_0) < p(s_1)]}{|S^0| \cdot |S^1|} \qquad \text{[Equation 9]}$$

In Equation 9, p is a safety situation probability of corresponding samples. $1[f(\cdot)]$ is a function that is 1 when an internal function of the function is true and 0 when the internal function of the function is false. $S^0$ is a set of negative samples. $S^1$ is a set of positive samples.

Figure 11:
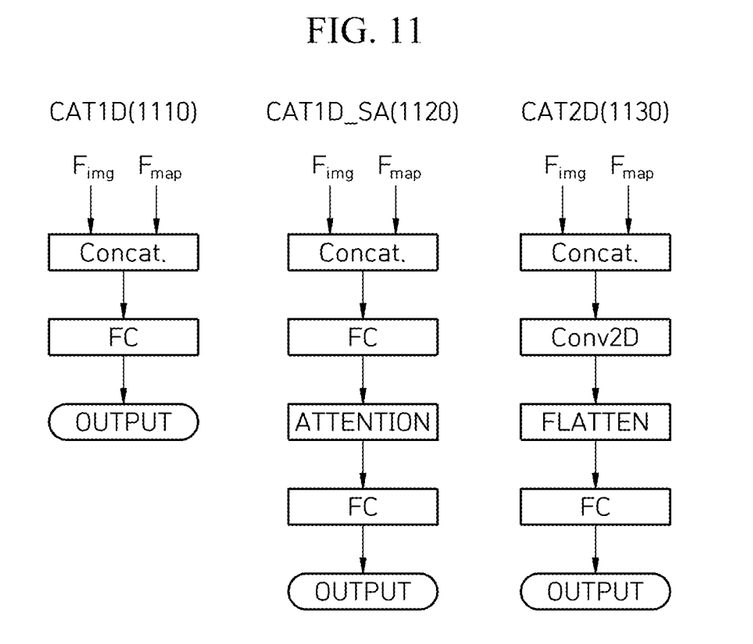
FIG. 11 is a diagram illustrating examples of a conventional feature fusion method.

To validate the effectiveness of the pedestrian risk situation evaluation, four widely used conventional feature fusion methods have been implemented as shown in FIG. 11. FIG. 11 is a diagram illustrating examples of a conventional feature fusion method.

In FIG. 11, one-dimensional (1-D) feature vectors $f_{img}$, $f_{map}$ have been obtained by applying two-dimensional (2-D) global average pooling to the feature maps $F_{img}$, $F_{map}$. As illustrated in the experiment results of Table 1, the fusion of semantic features of the ground had better performance than the use of only an RGB image (IMG_ONLY). Furthermore, it was checked that using a 2-D feature map instead of a 1-D feature vector is helpful to the improvement classification performance while maintaining space of information. Finally, it was checked that the feature fusion method according to an embodiment of the present disclosure has the best performance.

TABLE 1

| Model | ACC | AUC | F1 | Precision | Recall |
|---|---|---|---|---|---|
| IMG_ONLY | 0.739 | 0.802 | 0.659 | 0.606 | 0.724 |
| CAT1D(1110) | 0.846 | 0.896 | 0.738 | 0.908 | 0.622 |
| CAT1D_SA(1120) | 0.834 | 0.864 | 0.706 | 0.924 | 0.571 |
| CAT2D(1130) | 0.854 | 0.882 | 0.871 | 0.821 | 0.744 |
| Our PedRiskNet | 0.888 | 0.908 | 0.839 | 0.840 | 0.838 |

Figure 12:
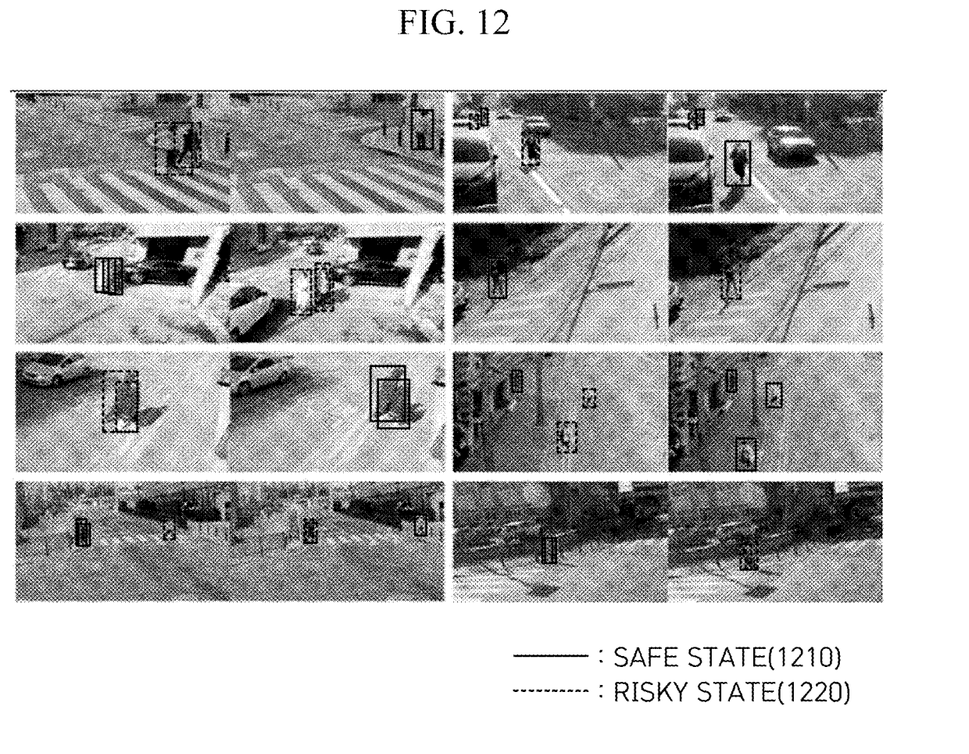
FIG. 12 is a diagram illustrating an example of the results of the estimation of a pedestrian risk situation in an embodiment of the present disclosure.

FIG. 12 is a diagram illustrating an example of the results of the estimation of a pedestrian risk situation in an embodiment of the present disclosure. The results of a determination of a potential risk situation of a pedestrian are indicated as a bounding box by determining the potential risk situation. A solid line illustrates a safe state 1210, and a dotted line illustrates a risky state 1220. In FIG. 12, images constituting each pair show the state before the potential risk situation of the pedestrian is changed and the state after the potential risk situation of the pedestrian is changed. According to an embodiment of the present disclosure, it may be seen that a risk situation of a pedestrian is well determined.

The aforementioned embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method of estimating a pedestrian risk situation, the method being performed by a computer and comprising:
    receiving an image captured by a CCTV camera that is installed at a predetermined location;
    generating a bounding box of a pedestrian within the image;
    generating a segmentation map by performing semantic segmentation on the image;
    generating a ground area map by identifying a ground area in the segmentation map; and
    estimating semantic location information of the pedestrian based on the bounding box and the ground area map,
    wherein the generating of the ground area map by identifying the ground area in the segmentation map comprises:
    generating a ground area mask in which pixels belonging to the ground area have been set as true;
    calculating an accumulation probability of the ground area over time by applying the ground area mask to the segmentation map; and
    generating the ground area map indicating to which ground area each pixel belongs based on the accumulation probability.

2. The method of claim 1, wherein the estimating of the semantic location information of the pedestrian based on the bounding box and the ground area map comprises:
    estimating a foot area of the pedestrian from the bounding box; and
    estimating the semantic location information of the pedestrian by assigning a ground area class that corresponds to a class having a largest number of pixels corresponding to the foot area of the pedestrian in the ground area map.

3. The method of claim 2, wherein the estimating of the foot area of the pedestrian from the bounding box comprises estimating the foot area of the pedestrian by assigning a bottom area which has a predetermined ratio from size information of the bounding box.

4. The method of claim 1, further comprising:
    extracting an image area of a surrounding part of the pedestrian from the image and the bounding box; and
    estimating a degree of risk of the pedestrian based on the image area of the surrounding part and the ground area map.

5. The method of claim 4, wherein the extracting of the image area of the surrounding part of the pedestrian from the image and the bounding box comprises:
    extracting a first feature map comprising visual features of the surrounding part of the pedestrian based on the image and the bounding box; and
    extracting a second feature map comprising ground features of the surrounding part of the pedestrian based on the ground area map and the bounding box,
    wherein the estimating of the degree of risk of the pedestrian based on the image area of the surrounding part and the ground area map comprises outputting the degree of risk of the pedestrian based on a probability by concatenating the first and second feature maps.

6. The method of claim 5, wherein the extracting of the first feature map comprises:
    generating a first crop image by cropping an area corresponding to a predetermined multiple size of the bounding box;
    removing an area corresponding to the bounding box in the first crop image; and extracting the first feature map comprising the visual features of the surrounding part of the pedestrian by inputting the first crop image to a pre-trained visual feature extraction network.

7. The method of claim 6, wherein the extracting of the second feature map comprises:
converting the ground area map into an RGB image and then generating a second crop image by cropping an area identical with an area of the first crop image; and
extracting the second feature map comprising the ground features of the surrounding part of the pedestrian by inputting the second crop image to a pre-trained ground area feature extraction network.

8. A method of estimating a pedestrian risk situation, the method being performed by a computer and comprising:
receiving an image captured by a CCTV camera that is installed at a predetermined location;
generating a bounding box of a pedestrian within the image;
generating a segmentation map by performing semantic segmentation on the image;
generating a ground area map by identifying a ground area in the segmentation map;
extracting an image area of a surrounding part of the pedestrian from the image and the bounding box; and
estimating a degree of risk of the pedestrian based on the image area of the surrounding part and the ground area map,
wherein the extracting of the image area of the surrounding part of the pedestrian from the image and the bounding box comprises:
extracting a first feature map comprising visual features of the surrounding part of the pedestrian based on the image and the bounding box; and
extracting a second feature map comprising ground features of the surrounding part of the pedestrian based on the ground area map and the bounding box,
wherein the extracting of the first feature map comprises:
generating a first crop image by cropping an area corresponding to a predetermined multiple size of the bounding box;
removing an area corresponding to the bounding box in the first crop image; and
extracting the first feature map comprising the visual features of the surrounding part of the pedestrian by inputting the first crop image to a pre-trained visual feature extraction network.

9. The method of claim 8, wherein the extracting of the second feature map comprises:
converting the ground area map into an RGB image and then generating a second crop image by cropping an area identical with an area of the first crop image;
extracting the second feature map comprising the ground features of the surrounding part of the pedestrian by inputting the second crop image to a pre-trained ground area feature extraction network; and
outputting the degree of risk of the pedestrian based on a probability by concatenating the first and second feature maps.

10. A system for estimating a pedestrian risk situation, comprising:
a communication interface configured to receive an image captured by a CCTV camera installed at a predetermined location;
memory in which a program for estimating a degree of risk of a pedestrian based on the captured image has been stored; and
a processor configured to generate a bounding box of the pedestrian within the image, generate a segmentation map by performing semantic segmentation on the image, generate a ground area map by identifying a ground area in the segmentation map, extract an image area of a surrounding part of the pedestrian from the image and the bounding box, and estimate the degree of risk of the pedestrian based on the image area of the surrounding part and the ground area map, by executing the program stored in the memory,
wherein the processor generates a ground area mask in which pixels belonging to the ground area have been set as true, calculates an accumulation probability of the ground area over time by applying the ground area mask to the segmentation map, and generates the ground area map indicating to which ground area each pixel belongs based on the accumulation probability.

11. The system of claim 10, wherein the processor estimates a foot area of the pedestrian from the bounding box, and estimates semantic location information of the pedestrian by assigning a ground class area that corresponds to a class having a largest number of pixels corresponding to the foot area of the pedestrian in the ground area map.

12. The system of claim 11, wherein the processor estimates the foot area of the pedestrian by assigning a bottom area which has a predetermined ratio from size information of the bounding box.

13. The system of claim 10, wherein the processor extracts a first feature map comprising visual features of the surrounding part of the pedestrian based on the image and the bounding box and extracts a second feature map comprising ground features of the surrounding part of the pedestrian based on the ground area map and the bounding box.

14. The system of claim 13, wherein the processor generates a first crop image by cropping an area corresponding to a predetermined multiple size of the bounding box, removes an area corresponding to the bounding box in the first crop image, and extracts the first feature map comprising the visual features of the surrounding part of the pedestrian by inputting the first crop image to a pre-trained visual feature extraction network.

15. The system of claim 14, wherein the processor generates a second crop image by cropping an area identical with an area of the first crop image after converting the ground area map into an RGB image, extracts the second feature map comprising the ground features of the surrounding part of the pedestrian by inputting the second crop image to a pre-trained ground area feature extraction network, and outputs the degree of risk of the pedestrian based on a probability by concatenating the first and second feature maps.

* * * * *